United States Patent [19]

Elser et al.

[11] Patent Number: 4,542,171

[45] Date of Patent: Sep. 17, 1985

[54] THICKENERS AND BINDERS FORMING GELS IN GASOLINE

[75] Inventors: Wilhelm Elser, Griesheim; Klaus Huebner, Ober-Ramstadt; Werner Siol; Theodor Mager, both of Darmstadt; Michael Wicke, Seeheim-Jugenheim, all of Fed. Rep. of Germany

[73] Assignee: Röhm GmbH, Darmstadt, Fed. Rep. of Germany

[21] Appl. No.: 650,089

[22] Filed: Sep. 13, 1984

[30] Foreign Application Priority Data

Sep. 16, 1983 [DE] Fed. Rep. of Germany ....... 3333503

[51] Int. Cl.$^4$ ...................... C08F 267/06; C08L 31/02
[52] U.S. Cl. .................................... 523/201; 524/504; 525/303; 525/305; 525/307; 525/310
[58] Field of Search ..................... 523/201; 524/504; 525/303, 305, 307, 310

[56] References Cited

U.S. PATENT DOCUMENTS

| 3,793,402 | 2/1974 | Owens | 260/876 R |
| 4,107,120 | 8/1978 | Plamondon et al. | 523/201 |
| 4,113,917 | 9/1978 | Tugukuni et al. | 525/303 |
| 4,351,875 | 9/1982 | Arkens | 523/201 |
| 4,468,498 | 8/1984 | Kowalski et al. | 523/201 |

FOREIGN PATENT DOCUMENTS

| 22982 | 1/1981 | European Pat. Off. . |
| 2253689 | 5/1973 | Fed. Rep. of Germany . |
| 2060545 | 5/1974 | Fed. Rep. of Germany . |
| 1327530 | 8/1973 | United Kingdom . |
| 1424724 | 2/1976 | United Kingdom . |

Primary Examiner—Lewis T. Jacobs
Attorney, Agent, or Firm—Curtis, Morris & Safford

[57] ABSTRACT

A two-step emulsion polymerization method for making an aqueous emulsion of core/shell polymer particles recoverable as a polymer powder by spray drying the emulsion, said polymer being capable of swelling and forming a gel in gasoline, and paints and coating compositions containing gasoline and such a polymer powder as a thickening agent or binder.

10 Claims, No Drawings

THICKENERS AND BINDERS FORMING GELS IN GASOLINE

The present invention relates to a method for making emulsion polymers which are capable of swelling and forming a gel in gasoline and which can be recovered as powders by spray drying the aqueous emulsion in which they are prepared and to the emulsion polymers so made, which polymers, in powdered form, are adaptable to use as thickeners and binders in paints and coating compositions containing gasoline, and to such paints and coating compositions.

Polymers which swell and form gels in gasoline and which are useful as thickeners and binders in anhydrous paints and coating compositions are known from published European patent application No. 22,982. They are copolymers of higher alkyl esters of acrylic or methacrylic acid with vinyl aromatic hydrocarbons or intermediate alkyl esters of acrylic or methacrylic acid and with polyunsaturated crosslinking agents and are preferably prepared by aqueous emulsion polymerization. The emulsion polymer is isolated from the dispersion formed by precipitation, filtration, and drying, or by spray or fluidized bed drying.

Of the methods mentioned for isolating the dried emulsion polymer, spray drying is the most advantageous because in one operation it yields a finely divided powdered product. However, its drawback is that, because of the low softening temperature of the emulsion polymer, it can only be carried out at low temperatures and at very low throughput rates. In addition, the powdered polymer obtained is storable only at low temperatures and tends to agglomerate at the elevated ambient temperatures occasionally encountered in shipping or storage.

Thus, there has been a need to develop a thickener and binder that will gel in gasoline and will not agglomerate either during its production by spray drying under the operating conditions usually employed industrially or during storage at elevated ambient temperature.

It is generally known that the thermal behavior of emulsion polymers can be improved by a multistage production process wherein a polymer shell having an elevated softening temperature is produced on the latex particles during the last stage. In the present case, too, it was possible to reduce considerably the tendency to agglomerate by producing a shell of polyisobutyl methacrylate in a second stage of the emulsion polymerization. However, in solution the thickener so produced did not readily break down into droplets, as desired, but showed a tendency to string (i.e. was "short" or "ropy"). This drawback could not be overcome even by using in the shell, too, the crosslinking agent used in the core of the emulsion polymer. With increasing amounts of crosslinking agent, the thickening action vanished along with the tendency to string.

It has been found that thickeners gelling in gasoline and free of the aforementioned tendencies to agglomerate can be obtained by preparing a two stage emulsion polymer of (A) at least 80 percent by weight of at least one alkyl ester of methacrylic acid or of a mixture of at least one ester of acrylic acid and at least one ester of methacrylic acid, wherein said esters have at least 4 carbon atoms in the alkyl group;

(B) at least one crosslinking monomer;

(C) from 0 to 20 percent by weight of at least one monoolefinically unsaturated aromatic comonomer; and (D) from 0 to 10 percent by weight of at least one monoolefinically unsaturated comonomer which is not soluble in gasoline, which copolymer comprises from 40 to 80 percent, by total weight of the emulsion polymer, of a core of the aforementioned composition which contains, as the crosslinking monomer (B), from 0.1 to 2 percent, by weight of the core material, of a monomer of a compound having at least two polymerizable olefinic carbon-carbon double bonds whose reactivity is comparable to that of monomer (A), and from 60 to 20 percent, by total weight of the polymer, of a shell of the aforementioned composition which contains, as the alkyl esters of methacrylic acid (A), monomers of isobutyl methacrylate or of cyclohexyl methacrylate and, as crosslinking monomers (B), from 0.05 to 4 percent, by weight of the shell, of graftlinking monomers having an olefinic carbon-carbon double bond whose reactivity is comparable to that of the monomers (A) and at least one further olefinic carbon-carbon double bond of lower reactivity.

An emulsion polymer structured in accordance with the invention can be isolated from an aqueous dispersion thereof by spray drying at about 70° C. at a rate corresponding to the capacity of the usual spray dryers. The fine powder so obtained can be stored even at a temperature of 40° C. without agglomerating and remains readily soluble in gasoline. A gasoline solution of the copolymers readily breaks down into droplets i.e. is "short" or "non-ropy".

Moreover, it has been observed that the core/shell structure of the emulsion polymer results in favorable swelling characteristics in aliphatic hydrocarbons. Thus, even if the core copolymer is of a hardness that would permit isolation of such a copolymer along by spray drying, a solution made from such a copolymer exhibits less advantageous flow behavior than the binder solutions of the invention.

The copolymer of the invention can be employed as a thickener and binder in the same way as prior art thickeners and binders to produce physically drying paints and coating compositions containing gasoline as solvent.

The term "gasoline" is employed in the present specification and claims as designating mixtures of aliphatic hydrocarbons boiling in the range from 100° C. to 250° C., which mixtures may optionally contain up to 20 percent by weight of one or more aromatic hydrocarbons such as toluene or xylene.

As produced, in other words before its isolation by spray drying, the emulsion copolymer of the invention consists of latex particles dispersed in a water phase. The average particle diameter should be greater than 100 nanometers (nm), and preferably greater than 150 nm. The average particle diameter is a weight average which can be determined by turbidity measurements, for example. The portion of the polymer produced in the first stage of the emulsion polymerization is the "core material", and the "shell material" is the portion produced in the second stage. It is assumed that the shell material encloses the core material sufficiently for the core material of a latex particle to be unable to make contact with the core material of another particle it is approaching. This assumption is consistent with the properties of the polymer. The amount of the emulsion polymer represented by the core material preferably is from 40 to 80 percent by weight of the polymer and the proportion of the shell material thus ranges from 20 to 60 percent. If the shell material accounts for less than 20 percent by weight, the powder particles may stick together during storage and the polymer may stick to the spray dryer. An amount of shell material exceeding 60 weight percent is not necessary for the desired effect and, in fact, could be detrimental with respect to thickening properties.

Both the core material and the shell material are of such composition that they swell in gasoline to form a gel. True solubility is prevented by the use of crosslinking monomers in both polymer components. However, both components would be soluble in gasoline if each were produced without the crosslinking component (B). Thus, if there is a question whether a particular polymer will have the swellability required by the invention, the corresponding uncrosslinked emulsion polymer composed of component (A) and, optionally, components (C) and (D) can be prepared. Such a polymer should be soluble in gasoline. If it is, the corresponding crosslinked polymer will be swellable.

The monomers (A) are chosen so that, because of their intermediate to higher alkyl groups, they will form gasoline soluble homopolymers. The alkyl groups may be linear or branched and usually do not contain more than 18 carbon atoms. For the purposes of the invention, more than 12 carbon atoms are not required. The preferred monomers (A) contain alkyl groups having from 4 to 8 carbon atoms, and particularly branched alkyl or cycloalkyl groups.

The monomers of group (A) differ with respect to their plasticizing effect on the polymers of whose composition they are a part. Alkyl esters of acrylic acid have greater plasticizing action than do the corresponding alkyl esters of methacrylic acid having alkyl groups of the same size. In the case of acrylic and methacrylic esters, the plasticizing action increases with an increasing number of carbon atoms up to about $C_{12}$ and then decreases with still higher alkyl groups. Isobutyl, sec-butyl, and cyclohexyl methacrylate, and also tert-butyl acrylate, result in relatively hard polymers, while n-butyl methacrylate yields polymers of lesser hardness. Soft to very soft polymers result from the use of alkyl esters of methacrylic acid with $C_6$ to $C_{12}$ alcohols, and from all alkyl esters of acrylic acid except tert-butyl acrylate. As a rule, alkyl esters of methacrylic acid will form the major portion of component (A).

Regulation of the hardness or softness of the core material will depend on the end use. For use as the sole binder for paints containing a high proportion of filler or for use as a thickener along with a harder binder, relatively soft emulsion polymers having $T_{\lambda max}$ values down to 20° C. are suitable. The $T_{\lambda max}$ value is the temperature of the damping maximum in the torsional vibration test in conformity with DIN 53445, measured on a film of the emulsion polymer (core plus shell). However, if the core material is formulated to be very soft, adhesion and agglutination problems are likely to arise in the production and storage of the polymer, particularly when the proportion of the shell material is very low. The $T_{\lambda max}$ value of the core material preferably ranges from 20° C. to 80° C. and more particularly from 40° C. to 75° C.

Pronounced polymer hardness, coupled with a high $T_{\lambda max}$ value, is desirable especially when the emulsion polymer is to be used as the sole binder in paints or coating compositions with a relatively low filler content or as a thickener or co-binder together with highly plasticized binders or with plasticizing additives.

The hardness of the core material will depend on the nature of all the monomer components going into its composition. Aromatic comonomers will have a hardening effect on the emulsion polymer but will not reduce its swellability in gasoline. By "aromatic comonomers" are meant monomers having at least one aromatic group, and particularly a phenyl group, which may carry lower alkyl substituents such as one or more methyl, ethyl, propyl, or butyl groups, and having, moreover, a group capable of free radical polymerization, such as a vinyl, isopropyl, acryl, or methacryl group, which may be linked to the aromatic group either directly or through an intermediate group. Styrene, alpha-methylstyrene, vinyltoluene, and benzyl acrylate or methacrylate are examples of suitable monomers. If used in large amounts, these monomers would increase the tendency of the paints and coatings to yellow, for which reason they should not be used in amounts exceeding 20 percent by weight of the emulsion polymer.

Monoolefinically unsaturated compounds capable of free radical polymerization, or at least copolymerization, which as such or in the form of their homopolymers are not soluble in gasoline at room temperature, are here designated as comonomers which are not soluble in gasoline. A maximum of 10 percent by weight of such compounds in the core or shell material will not render the polymer insoluble if the other monomeric components, for example, higher alkyl esters of methacrylic acid, sufficiently promote its solubility. Otherwise the amount of the monomeric component (D) should be kept well under 10 percent by weight.

The comonomers (D) may be used to impart specific desired properties to the polymer. For example, comonomers containing hydroxyl groups, and more particularly hydroxyalkyl esters of acrylic or methacrylic acid wherein the alkyl group preferably contains from 2 to 4 carbon atoms, will improve the incorporation of pigments. Comonomers containing amino groups, such as N-vinylimidazole or dialkylaminoalkyl esters, and amides of acrylic and methacrylic acid will improve the adhesion of paints and coating compositions made from the polymers to a substrate. Even when used in small amounts, lower esters of acrylic acid, and particularly of methacrylic acid, for example methyl methacrylate, are capable of accelerating the polymerization of the other monomers.

The hardness of the emulsion polymer or of the film which can be produced therefrom is further influenced by the properties and amount of the shell material. Except for the degree of polymerization and the nature of the crosslinking agent, the shell material may have the same composition as the core material but usually is formulated to be harder. So far as their quality in the gel state is concerned, it will be advantageous for the core and shell materials to be compatible with each other. This will be the case when solutions of the respective uncrosslinked polymers in gasoline are miscible without precipitation. The shell material contains units of isobutyl or cyclohexyl methacrylate as monomeric component (A), isobutyl methacrylate being preferred. These monomers, also in combination with aromatic comonomers, yield hard polymers, as a result of which the overall hardness of the emulsion polymer usually is increased in relation to the hardness of the core material alone. The $T_{\lambda max}$ value of the shell material, if produced separately, preferably ranges from 70° C. to 100° C. The minimum film forming temperature of the underlying emulsion polymer dispersion then will be above 65° C. This will make it possible to carry out spray drying below the minimum film forming temperature so that clot formation or sticking is not likely to occur. The controlling factor is the outlet temperature of the air stream used in spray drying.

If the emulsion polymer were not crosslinked, it would give viscous, stringy true solutions in gasoline, which solution are undesirable from the point of view of their use. Crosslinking prevents true solubility in gasoline, but must be limited to permit the polymer particles to be transformed in gasoline into strongly swollen gel particles. At a concentration of 20 to 30 parts of polymer per 100 parts gasoline, for example, practically clear apparent solutions having a definite yield point are obtained. While the yield point is actually measurable, the practitioner will usually prefer a visual evaluation of flow behavior. An important property of these solutions is that despite their high viscosity they are not stringy but are readily broken up. This property is essential when they are to be used as thickeners and binders in coating compositions and plasters with high filler loading which show little tendency to flow after being applied to a substrate. This property is also referred to, although inaccurately, as thixotrophy.

The optimum of this gel forming capacity can be established by careful metering of the amount of crosslinking linking agent and by observation of the viscosity characteristics so obtained. Optimization is facilitated when the shell material is omitted for testing purposes and a method of isolation is used in which the material does not agglutinate excessively, for example, freeze drying. If too little crosslinking agent is used, the polymer formed will be crosslinked, but still truly soluble in gasoline and stringy. On the other hand, if too much crosslinking agent is used, the polymer particles will not swell sufficiently and there will be neither a thickening action nor the ready breakup behavior mentioned earlier. The optimum will usually be slightly greater than that content of crosslinking agent which just falls short of permitting a true solution of the polymer to be prepared that is dilutable at will and where, with strong dilution, a separation can be observed between the swollen gel and a clear solvent phase. The amount of crosslinking agent in the core material should range from 0.1 to 2 percent, and preferably ranges from 0.2 to 1 percent, by weight of the core material. With crosslinking agents of high molecular weight, the optimum generally will be reached with a larger amount by weight of the agent than in the case of crosslinking agents of lower molecular weight.

The invention is based on the surprising discovery that the nature of the crosslinking agents used in the core material and in the shell material is an important factor affecting gel forming characteristics. It has been found that the only crosslinking agents which are suitable for crosslinking the core material are those which have at least two polymerizable olefinic carbon-carbon double bonds whose reactivity is comparable to that of the monomers (A). This will be the case when these double bonds are not converted at a substantially faster or substantially slower rate during polymerization than are those of the monomers (A).

The monomers (A) contain methacrylic ester and, optionally, acrylic ester, groups. Any crosslinking agent which also contains two or more acrylic or methacrylic ester groups can readily be included in the class of compounds with double bonds of comparable reactivity. This is substantially true also of compounds having two or more acrylamido or methacrylamido groups, such as methylene-bis-acrylamide, and of compounds containing two or more vinyl groups attached directly to an aromatic group, for example divinylbenzene.

Preferred crosslinking agents for the core material are esters of acrylic or methacrylic acid and diols or polyols which contain at least two of said acid groups, in other words diol diacrylates and dimethacrylates, triol triacrylates and trimethacrylates, etc. Illustrative of these crosslinking agents are the diacrylates and dimethacrylates of ethylene glycol, propylene glycol, 1,2- or 1,4-butylene glycol, 1,6-hexanediol, 1,2-decanediol, neopentyl glycol, diethylene glycol, triethylene glycol, tetraethylene glycol, dipropylene glycol and tripropylene glycol, as well as trimethylolpropane diacrylate, dimethacrylate, triacrylate and trimethacrylate, and pentaerythritol tetraacrylate and tetramethacrylate.

While crosslinking agents of this type have been used in the past to produce gel forming thickeners and binders, it was not known that they cannot be replaced with crosslinking agents having two double bonds of differing reactivities. If the latter were used, highly fluid polymer systems would be obtained. It is all the more surprising that the exact opposite is true of the shell material: When crosslinking agents having double bonds of the same reactivity are used in its preparation, the resulting emulsion polymers are either filament forming or non-thickening. The emulsion polymer will have the desired gel forming properties only when "graftlinking" compounds are used in the shell material. These are compounds which contain only one polymerizable olefinic carbon-carbon double bond whose reactivity is comparable to that of the monomers (A) and which contain at least one further olefinic carbon-carbon double bond whose reactivity is significantly lower and which therefore reacts more slowly during polymerization than do monomers (A). The first mentioned double bond is preferably contained in an acrylic or methacrylic group and more particularly in an acrylic or methacrylic ester group, while the last mentioned double bond may be an allyl, methallyl, crotyl, or cycloalkenyl group. Preferred graftlinkers are allyl acrylate and allyl methacrylate. The prior art concept of "graftlinking" is dealt with in detail in published German patent application DAS 22 53 689.

The optimum amount of graftlinker for the shell material is determined in exactly the same manner as that of the crosslinker in the core material, and should be done after prior optimization of the core material. The amount of graftlinker should range from 0.05 to 4 percent, preferably from 0.05 to 2.5 percent, by weight of the shell material. For allyl methacrylate, the optimum will usually be between 1 and 2 weight percent.

The emulsion polymer may be produced by known multistage emulsion polymerization methods. Basically the polymerization is carried out in an aqueous phase which contains emulsifying agents. Suitable emulsifiers are water soluble surfactants having HLB values ranging from 8 to 18 and which are commonly used in emulsion polymerization. Anionic emulsifiers are preferably used. However, nonionic or cationic emulsifiers and combinations thereof, to the extent that they are compatible with one another, may also be used. Examples of commonly used anionic emulsifiers are soaps, sulfonates such as sodium paraffin sulfonate and sodium dodecylbenzene sulfonate, sulfates such as sodium lauryl sulfate, sodium cetyl sulfate and sodium oleyl sulfate, and the alkali metal salts of sulfonated ehtylene oxide adducts of alkylphenols such as triisobutylphenol or nonylphenol. Such alkylphenols are reacted with a 2- to 10-fold molar amount of an alkylene oxide, are sulfated, and are then neutralized.

The amount of emulsifier present at the start of the emulsion polymerization has an influence on particle size. Increasing the initial amount of emulsifier will result in a reduction of the average particle size, and vice versa. The average particle size (weight average based on turbidity measurement) should range from 100 to 1000 nm, and preferably from 150 to 500 nm.

In the first process stage, the core material is produced from the monomers (A) to (D) which go into its composition. These monomers may be emulsified in the water phase before the start of polymerization or may be gradually added, either as such or as an aqueous emulsion, during the polymerization. The polymerization is carried out at a temperature ranging from 60° C. to 90° C., generally using water soluble initiators and particularly alkali metal or ammonium persulfates. As soon as the monomers of the core material have been completely added and are largely or completely polymerized, emulsion polymerization may be continued in the second process stage, possibly without any change in the process conditions. For this purpose, the monomers of the second stage may be emulsified in the latex from the first stage and then polymerized, or may be gradually added either as such or as an aqueous emulsion, under polymerization conditions. When the second stage monomers have also been completely added, polymerization conditions are maintained until complete conversion is achieved. The usual steps may then be taken for the reaction or removal of unreacted monomers.

The desired swelling behavior of the emulsion polymer depends, among other things, on a sufficiently high degree of polymerization of the crosslinked molecules of the polymer chain of the core material. Because of the crosslinking, the degree of polymerization or the molecular weight, respectively, is not measureable directly. A high degree of polymerization is obtained when all factors inhibiting or terminating polymerization are eliminated to the greatest extent possible in the first stage of the emulsion polymerization. Polymerization therefore is carried out as far as possible in the absence of chain transfer agents such as thiols, sulfides, chlorinated hydrocarbons, or terpenes, and in the absence of inhibitors such as phenols, primary or secondary amines, and hydroquinones. Moreover, the free radical flow rate, that is, the amount of free radical forming initiators decomposing per unit time during the polymerization, should be kept so low that the polymerization can be carried out at just the technically required rate. For this reason, foreign substances accelerating polymerization, such as reducing agents or heavy metals, should be excluded to the greatest extent possible, unless they are used deliberately as constituents of a redox system at an appropriately low temperature. The amount of initiator is preferably limited to 0.05 percent by weight of the monomers.

While the core material should be of as high a molecular weight as possible, a lesser degree of polymerization is preferred for the shell material. The latter therefore is preferably produced in the presence of a chain transfer agent such as dodecyl mercaptan, a thioglycolic ester of butanol, of 2-ethylhexanol, or of 1-octanol, or some other thiol.

The amount of the modifier should range from 0.1 to 1 percent and preferably ranges from 0.4 to 0.8 percent, by weight of the shell material.

The amounts of water initially charged and optionally introduced with the monomer emulsion should be coordinated with the total amount of monomers used in such a way that dispersions with a polymer content from 30 to 70 weight percent are obtained. Lower polymer contents are uneconomical because of the energy required to evaporate the water in spray drying, while higher polymer contents increase the likelihood of coagulation, agglomeration, adhesion, etc. From these points of view, dispersions having a solids content ranging from 40 to 50 weight percent are best. Spray drying is the method best suited for transforming the dispersion to a powdered solid product. When the core and shell materials are sufficiently hard, drying temperatures up to 90° C. can be employed. With outlet air temperatures ranging from 60° C. to 80° C., sticking to the spraying and distributing means and to the walls of the spray dryer and agglomeration of the deposited powder are effectively avoided.

When the outlet air temperature is higher than the glass transition temperature of the emulsion polymer, powder particles which are glassy or baked together are obtained, whereas loosely structured powder particles substantially composed of loosely aggregated latex particles are obtained when the drying temperature is below the glass transition temperature. Unless the glass transition temperature of the core material is far below that of the shell material, the glass transition temperature of the shell material will be the controlling factor.

The dried powder particles usually range in size from about 10 to 500 microns. They will be the more readily soluble in gasoline the less glassy and baked together the latex particles in the individual powder particles are. The powder may be stored in drums, bags, or powder containers at temperatures up to 60° C. without danger of agglutination.

In practice, no sharp line can be drawn between the use of the emulsion polymer as a binder and as a thickener. In both cases, a solution of the emulsion polymer is processed with pigments and fillers to form a physically drying coating composition that can be applied by the brush coating, spray coating, or knife coating. The gasoline soluble binders in use for this purpose often do not result in the desired viscosity which prevents the breaking away of the binder on porous, absorbent substrates, or the desired readily broken-up viscosity behavior which is required when thick coatings of materials containing a high proportion of filler are to be applied in one operation. On the other hand, binders which do not form gels will often give higher gloss and better flow of the coating, especially with coating materials with a low filler content.

By mixing the thickener and binder of the invention with gasoline soluble binders which are not crosslinked and hence not gel forming, coating compositions can be produced which represent a reasonable balance of structure forming and thixotropic properties, on the one hand, and flow promoting and gloss promoting properties, on the other hand, that is appropriate to the filler loading and to the type of the coating. The mixing ratio of the two binder components can be varied as desired, for example from 1:99 to 99:1 parts by weight. Both components will be found to produce noticeable effects especially in the mixing range from 10:90 to 90:10. Chlorinated paraffins may be used concurrently as additional plasticizers and binders in an amount of up to 50 weight percent of the total binder. Non-crosslinked gasoline soluble binders which are particularly well suited for mixing with the thickeners and binders of the invention are known in the prior art, e.g. the materials disclosed in British patent No. 1,327,530. Binders that are highly suitable for admixing have a reduced viscosity from 20 to 70 ml/g and the following polymer composition:

(a) 39 to 95 percent by weight of isobutyl or cyclohexyl methacrylate;

(b) 3 to 60 percent by weight of at least one alkyl ester of acrylic acid or of methacrylic acid having from 6 to 12 carbon atoms in the alkyl group; and (c) 1 to 10 percent by weight of a hydroxyalkyl ester or hydroxyalkyl amide of acrylic acid and/or of methacrylic acid which has at least 2 carbon atoms in the hydroxyalkyl group and wherein the hydroxyl group is not attached to the alpha carbon atom.

Such polymers can be prepared by various methods generally know in the prior art, e.g. by solution polymerization in gasoline or, preferably, by bead polymerization (suspension polymerization) in an aqueous phase in the presence of chain transfer agents. As such agents, mercaptans are preferably used in an amount such that the reduced viscosity of the resulting polymer is from 20 to 70 ml/g. For example, 100 parts of a mixture of monomers, chain transfer agent, and a free radical forming agent soluble in the monomers (e.g. dilauroyl peroxide) are suspended as droplets in 300 parts of an aqueous phase containing 1 part of magnesium carbonate and 0.01 part of Na-alkylsulfonate (as suspending and distributing agents, respectively) and are then polymerized at 75°–80° C. for 2–3 hours. The beads so formed can be separated from the aqueous phase by filtration.

In the final coating composition, the ratio between binders, solvents, and pigments, including fillers, depends as usual on the requirements which the coating composition must meet with respect to processing properties and coating type. The pigment volume concentration should range from 40 to 70 percent for stucco paints and from 0 to 80 percent for synthetic resin plaster and colored stone plasters, when stone chips are not included in the pigments.

The amount of the solvent will usually range from 25 to 45 percent, by weight of the total coating composition. Suitable solvents are pure aliphatic hydrocarbons boiling in the range from 100° C. to 250° C., or a mixture thereof with up to 20 weight percent of aromatic hydrocarbons, such as toluene, xylene, or of higher alkylated aromatic hydrocarbons known as mineral spirits. While esters, ketones, glycol ethers, or similar typical paint solvents are not required, they may be used concurrently as flow control agents, as desired.

Preferred embodiments of the invention are described in the examples which follow. It was possible in all cases to dry the aqueous dispersions of the emulsion polymers produced in two stages to a powder in a commercial spray dryer whose capacity was fully utilized without appreciable polymer buildup on the walls and distributing means of the spray dryer. The powders so obtained are truly free flowing and can be stored in bags stacked in the usual heights without the powder particles sticking to one another.

All parts are parts by weight.

EXAMPLE 1

(a) Production of a powdered thickener 0.32 part of the sodium salt of the sulfated reaction product of 1 mole of tri-sec-butylphenol and 7 moles of ethylene oxide is heated to 80° C. in 192 parts of water with stirring and is mixed with 0.06 part of ammonium persulfate in a polymerization vessel equipped with reflux condenser, stirrer, and thermometer. For the first polymerization stage of core material formation, to this there are added, at 80° C., over a period of 2 hours, a previously prepared emulsion of 140.2 parts of water, 0.8 part of the above emulsifier, 112 parts of isobutyl methacrylate, 47.68 parts of 2-ethylhexyl methacrylate, and 0.32 part of glycol dimethacrylate.

In a second stage there are then added, for the formation of the shell material, over a period of 2 hours at 80° C., an emulsion of 140.2 parts of water, 0.8 part of the above emulsifier, 159.2 parts of isobutyl methacrylate, 0.8 part of allyl methacrylate, and 0.32 part of 2-ethylhexyl thioglycolate.

For further polymerization the batch is then held at 80° C. for 1 hour, after which it is cooled and filtered. A coagulate free dispersion with a solids content of about 40 percent is so obtained, which by spray drying at an outlet air temperature between 65° C. and 70° C. is then converted to a powdered product. The $T_{\lambda max}$ value of the polymer core is 64° C.

(b) Production of a stucco paint

Composition 72.0 parts of polymer A*,
8.0 parts of the powdered product described above,
80.0 parts of chlorinated paraffin, liquid (chlorine content, 60%),
340.0 parts of mineral spirits,
150.0 parts of titanium dioxide (rutile form),
50.0 parts of diatomaceous earth,
150.0 parts of dolomite, and
150.0 parts of crystalline calcium carbonate.

* Polymer A is an uncrosslinked copolymer prepared from 87.0 parts of isobutyl methacrylate, 10.0 parts of 2-ethylhexyl acrylate, and 3.0 parts of hydroxypropyl monoacrylate and having a reduced viscosity of 50 ml/g. The polymer is prepared in an aqueous phase in the presence of 0.5 percent of dilauroyl peroxide and 0.2 percent of dodecyl mercaptan, both by weight of the monomers, as earlier discussed herein.

This stucco paint can be applied by commonly used methods such as roller coating, spread coating, and spray coating. It is distinguished by ease of application, even at low temperatures and when there is a tendency to sag.

(c) Production of a granular plaster

A marble grit plaster is composed as follows:
88 parts of the powder product according to (a) above,
12 parts of a carbamate resin,
12 parts of silica gel as a flatting agent,
208 parts of mineral spirits, and
680 parts of marble grit.

EXAMPLE 2

An emulsion of 140.2 parts of water, 0.8 part of sodium lauryl sulfate, 112 parts of isobutyl methacrylate, 31.44 parts of 2-ethylhexyl methacrylate, 16 parts of 2-ethylhexyl acrylate, and 0.56 part of 1,4-butanediol dimethacrylate is added at 80° C. over a period of 2 hours as in Example 1 to an initial charge, heated to 80°

C., of 192 parts of water, 0.4 part of sodium lauryl sulfate, and 0.06 part of ammonium persulfate.

Following this, an emulsion of 159.36 parts of isobutyl methacrylate, 0.64 part of allyl acrylate, 0.5 parts of 2-ethylhexyl thioglycolate, 0.8 part of sodium lauryl sulfate, and 140.2 parts of water is fed in under the same conditions.

After further reaction for 1 hour, an approximately 40 percent coagulate free dispersion is obtained from which the polymer is isolated by spray drying at an outlet air temperature between 65° C. and 70° C.

$T_{\lambda max}$ of core polymer: 51° C.

EXAMPLE 3

(a) Production of a powdered thickener and binder 115.26 parts of isobutyl methacrylate, 40 parts of 2-ethylhexyl methacrylate, 2.4 parts of hydroxypropyl acrylate, 1.6 parts of methyl methacrylate, 0.74 part of trimethylolpropane triacrylate, 0.8 part of sodium $C_{15}$-paraffin sulfonate, and 140.2 parts of water are emulsified and, as in Example 1, added dropwise over a period of 2 hours to an initial charge, heated to 80° C., of 192 parts of water, 0.32 part of sodium $C_{15}$-paraffin sulfonate, and 0.056 part of ammonium persulfate.

An emulsion of 159.36 parts of isobutyl methacrylate, 0.64 part of allyl acrylate, 0.8 part of sodium $C_{15}$-paraffin sulfonate, and 140.2 parts of water is then fed in over a period of 2 hours and the batch is allowed to react further for 1 hour. For isolation of the solid, the dispersion is spray dried at an outlet air temperature not over 75° C.

$T_{\lambda max}$ of core polymer: 66° C.

(b) Production of a synthetic resin plaster

Composition 58.5 parts of thickener according to Example 3,
13.5 parts of polymer A,
17.0 parts of chlorinated paraffin, liquid (chlorine content, 60%),
228.0 parts of mineral spirits,
115.0 parts of titanium dioxide (rutile form), and
568.0 parts of calcite ranging in diameter from 0.01 to 1.5 mm.

This plaster can be applied with a plasterer's trowel to plaster and masonry in a thick coat without slumping on vertical surfaces.

EXAMPLE 4

As described in Example 1, an emulsion of 115.26 parts of isobutyl methacrylate, 40 parts of 2-ethylhexyl methacrylate, 2.4 parts of hydroxypropyl acrylate, 1.6 parts of methyl methacrylate, 0.74 part of 1,4-butanediol dimethacrylate, 140.2 parts of water, and 0.8 part of sodium $C_{15}$ paraffin sulfonate is added to a solution of 0.32 part of sodium $C_{15}$-paraffin sulfonate in 192 parts of water with which 0.056 part of ammonium persulfate has been mixed, which solution has been heated to 80° C. In a second stage, an emulsified mixture of 150.08 parts of isobutyl methacrylate, 8 parts of styrene, 1.92 parts of allyl methacrylate, 0.72 part of 2-ethylhexylthioglycolate, 0.8 part of sodium $C_{15}$-paraffin sulfonate, and 140.2 parts of water are polymerized. The approximately 40 percent coagulate free dispersion is spray dried at an outlet air temperature between 65° C. and 70° C.

$T_{\lambda max}$ of core polymer: 66° C.

EXAMPLE 5

As in Example 1, an initial charge, heated to 80° C., of 192 parts of water, 0.32 part of sodium $C_{15}$-paraffin sulfonate, and 0.056 part of ammonium persulfate is mixed with a monomer emulsion of 115.26 parts of 2-ethylhexyl methacrylate, 40 parts of isobutyl methacrylate, 2.4 parts of hydroxypropyl acrylate, 1.6 parts of methyl methacrylate, 0.74 part of 1,4-butanediol dimethacrylate, 0.8 part of sodium $C_{15}$-paraffin sulfonate, and 140.2 parts of water.

There is then fed in an emulsion for the polymer shell consisting of 158.08 parts of isobutyl methacrylate, 1.92 parts of allyl methacrylate, 0.72 part of 2-ethylhexyl thioglycolate, 0.8 part of sodium $C_{15}$-paraffin sulfonate, and 140.2 parts water. The batch is reacted further for 1 hour at 80° C. A coagulate free dispersion with a solids content of about 40 percent is so obtained, from which a fine polymer powder is obtained by spray drying below 70° C.

$T_{\lambda max}$ of core polymer: 38° C.

EXAMPLE 6

The dispersion is prepared as in Example 4, except that cyclohexyl methacrylate is substituted for styrene in the mixture added for the shell material. The dispersion is spray dried between 65° C. and 70° C.

What is claimed is:

1. A powder of particles of an emulsion polymer capable of swelling and forming a gel in gasoline, said polymer comprising:
   (A) at least 80 percent by weight of solid polymer of at least one alkyl ester of methacrylic acid having at least 4 carbon atoms in the alkyl or of a mixture of at least one alkyl ester of acrylic acid and at least one ester of methacrylic acid each having at least 4 carbon atoms in the alkyl,
   (B) at least one crosslinking molecule,
   (C) 0 to 20 percent by weight of said polymer of at least one monoolefinically unsaturated aromatic comonomer, and
   (D) 0 to 10 percent of at least one monoolefinically unsaturated comonomer not soluble in gasoline at room temperature, said particles consisting of
      (1) a core polymer which is from 40 to 80 percent by weight of the particle and in which crosslinking molecule (B) is from 0.1 to 2 percent, by weight of the core, of at least one monomer having at least two polymerizable olefinic carbon-carbon double bonds whose reactivity in polymerization is comparable with that of monomer (A), and
      (2) a shell polymer covering said core polymer, which is from 60 to 20 percent by weight of the particle wherein said monomer (A) is isobutyl methacrylate or cyclohexyl methacrylate and in which crosslinking molecule (B) is from 0.05 to 4 percent, by weight of the shell, of at least one graftlinking monomer having an olefinic carbon-carbon bond whose reactivity in polymerization is comparable with that of comonomers (A) and having at least one further olefinic carbon-carbon bond of lower reactivity.

2. A polymer as in claim 1 wherein component (D) comprises at least one hydroxyalkyl ester of acrylic acid or of methacrylic acid.

3. A polymer as in claim 1 wherein said core polymer has a $T_{\lambda max}$ from 20° C. to 80° C.

4. A physically drying paint comprising gasoline as a volatile liquid constituent, at least one filler or pigment, and a polymer powder as in claim 1 as a binder or thickener.

5. A paint as in claim 4 comprising up to 80 percent by volume of at least one pigment.

6. A paint as in claim 4 which additionally contains, as a binder or thickener, a non-crosslinked copolymer having a reduced viscosity from 20 to 70 ml/g and comprising (A) 39 to 95 percent by weight of said copolymer of isobutyl methacrylate or of cyclohexyl methacrylate, (B) 3 to 60 percent by weight of at least one alkyl ester of acrylic acid or of methacrylic acid having 6 to 12 carbon atoms in the alkyl, and (C) 1 to 10 percent, by weight of said copolymer, of at least one hydroxylalkyl ester or hydroxyalkyl amide of acrylic acid or of methacrylic acid, wherein said hydroxyalkyl group has at least 2 carbon atoms and the hydroxyl group is not present on the alpha carbon atom.

7. A paint as in claim 6 wherein the ratio by weight of the polymer of claim 1 to said non-crosslinked copolymer is between 1:99 and 99:1.

8. A paint as in claim 7 wherein said ratio is between 10:90 and 90:10.

9. A paint as in claim 4 which additionally comprises, as a binder, up to 50 percent, by weight of the total binder, of a chlorinated paraffin.

10. A paint as in claim 6 which additionally comprises, as a binder, up to 50 percent, by weight of the total binder, of a chlorinated paraffin.

* * * * *